US006883046B2

United States Patent
Shih et al.

(10) Patent No.: US 6,883,046 B2
(45) Date of Patent: Apr. 19, 2005

(54) SOFTWARE APPLICATION AND METHOD FOR SCANNING DOCUMENTS WITH A SCAN SYSTEM

(75) Inventors: Po-Sheng Shih, Hsin-Chu (TW); Chun-Chieh Liao, Hsin-Chu (TW)

(73) Assignee: Avision Inc., HsinChu (TW)

( * ) Notice: Subject to any disclaimer, the term of this patent is extended or adjusted under 35 U.S.C. 154(b) by 181 days.

(21) Appl. No.: 10/065,188

(22) Filed: Sep. 25, 2002

(65) Prior Publication Data

US 2004/0015624 A1 Jan. 22, 2004

(30) Foreign Application Priority Data

Jul. 22, 2002 (TW) ........................................ 91116295 A

(51) Int. Cl.⁷ ............................................. G06F 13/12
(52) U.S. Cl. .............................. 710/62; 710/64; 710/72; 710/73; 358/2.1; 358/408; 358/474; 358/498
(58) Field of Search ....................... 710/62–74; 358/2.1, 358/408, 474–498

(56) References Cited

U.S. PATENT DOCUMENTS

| 5,123,063 A | * | 6/1992 | Ohkubo ...................... 382/318 |
| 6,122,684 A | * | 9/2000 | Sakura ......................... 710/73 |
| 6,349,879 B1 | * | 2/2002 | Watanabe et al. ...... 235/462.15 |
| 6,493,757 B1 | * | 12/2002 | Sakai et al. ................. 709/226 |
| 6,648,226 B1 | * | 11/2003 | Haba .......................... 235/454 |

* cited by examiner

Primary Examiner—Jeffrey Gaffin
Assistant Examiner—Mike Nguyen
(74) Attorney, Agent, or Firm—Winston Hsu

(57) ABSTRACT

A method and an application installed in a computer system for controlling a plurality of scanners connected to the computer system being capable of feeding documents automatically. The scanners being parallel-connected to the computer system via an interface selecting from a group consisting of IEEE 1394, USB, and SCSI interfaces. The application comprises a scan code for controlling the scanners parallelly and a plurality of image files generated by the scanners scanning documents that can be transferred to the computer system, and a sort code for sorting the images files.

12 Claims, 3 Drawing Sheets

SOFTWARE APPLICATION AND METHOD FOR SCANNING DOCUMENTS WITH A SCAN SYSTEM

BACKGROUND OF THE INVENTION

1. Field of the Invention

The present invention relates to a software application and a method for scanning documents with a scan system. More specifically, an application and a method of arrangement of image files generated by a plurality of scanners that scan documents simultaneously are disclosed.

2. Description of the Prior Art

A scanner involves many fields such as optics, machinery, electronics, and software algorithms. Its main job is transforming physical image information into digital images files. The transformation process comprises selecting an original object (or document) to scan, transforming analog signals into digital signals, and performing software algorithms, each of these processes being connected with the others. While scanning numerous documents, in addition to scanning precision with respect to color, a most important factor is scan speed. However, conventional scanners are limited by mechanical structure, software algorithm speed, and electronic and optical mechanisms and thus have limited scan speeds.

Please refer to FIG. 1. FIG. 1 is a schematic diagram of a conventional scan system 10. The scan system 10 comprises a host computer 12, a bus 14, a plurality of scan codes 16, and a plurality of scanners 18. The scanners 18 connect with the host 12 via the bus 14. The bus 14 is a universal serial bus (USB), a firewire (IEEE 1394), an Ethernet cable, or a small computer system interface (SCSI). Each scan code 16 is used to process algorithms and coordinate file arrangement after the corresponding scanner 18 scans a document and generates document image files. Even though the host computer 12 can simultaneously electrically connect to the plurality of scanners 18, each scan code 16 still processes one image file from one scanner 18 at a time. If a user wants to operate the plurality of scanners 18 simultaneously, the user has to open the plurality of scan codes 16 in the host computer 12. In this way, the method results in a heavy burden on the host computer 12 and user inconvenience for manipulating windows successively to oversee all the scan jobs. More specifically, after scanning, the user has to clearly record each job corresponding to each scanner to avoid incorrect arrangement of scattered image files. This is obviously quite inefficient.

If a user wants to purchase a ten-times-faster scanner, the cost will be more than, ten times that of a typical scanner. If a user wants to generate ten-times the scans with ten identical scanners connected to parallel, according to the prior art, no software is capable of controlling the plurality of scanners to operate simultaneously and to automatically return the scattered image files to an initial arrangement. The user has to open the plurality of scan codes 16 and manually arrange the image files. This method is inefficient and prone to mistakes.

The U.S. Pat. No. 6,122,684 discloses a scan system connected to a network. A plurality of scanners connects with computers and to each other through the network, and a single computer can control the plurality of scanners to scan to promote a speed suitable for mass scanning of documents. However, the scanners connected via the network are very expensive and bandwidth of the network being limited by hardware and data flow results in a bottleneck of data transmission. Moreover, controlling operation of the scanners via network protocol requires more complicated procedures, and is thus more complicated than via IEEE 1394, USB, and SCSI interfaces.

The Taiwan Patent No. 458454 discloses an expansible scanner system. Based on the patent, a plurality of platform scanners are connected in parallel via a transmission interface resulting in a bottleneck of data transmission. Furthermore, the patent also does not disclose any method of arranging files generated by the scanners resulting in inconvenience for users.

SUMMARY OF INVENTION

Accordingly, a software application and a method for a scan system to mass scan documents are disclosed. The application and method are capable of automatically arranging images files generated by a plurality of scanners using a sort code. In addition, users are capable of expanding the scan system via the method of the claimed invention permitting increasing a number of auxiliary computers and scanners connected with the auxiliary computers.

The claimed invention provides an application installed in a computer system for controlling a plurality of scanners connected to the computer system being capable of feeding documents automatically, the scanners parallel-connected to the computer system via an interface selecting from a group consisting of IEEE 1394, USB, and SCSI interfaces. The application comprises a scan code for controlling the scanners parallelly and a plurality of image files generated by the scanners scanning documents that can be transferred to the computer system, and a sort code for sorting the images files.

The application makes the arrangement of the scan system more efficient and the cost simply vary linearly according to an amount of auxiliary computers and scanners.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
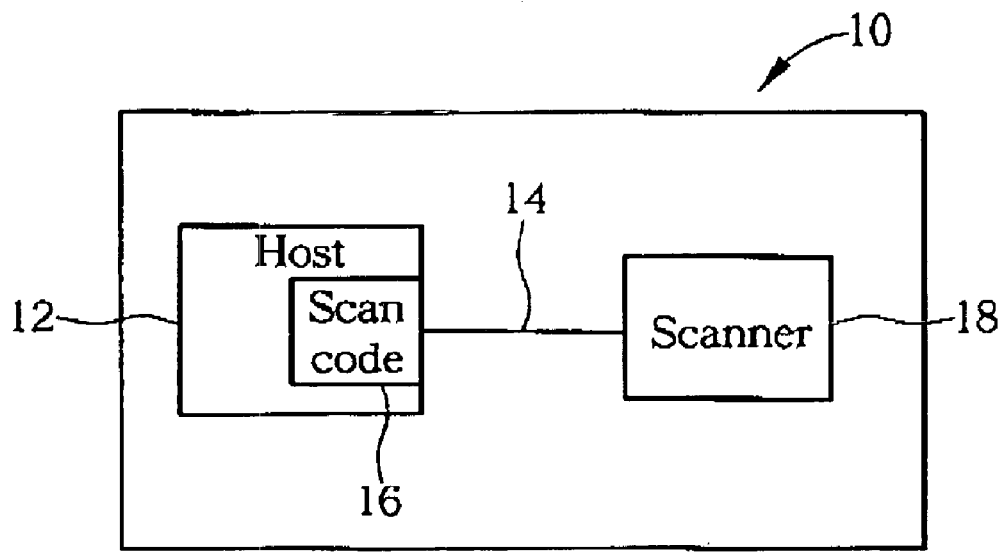
FIG. 1 is a schematic diagram of a conventional scan system.
Figure 2:
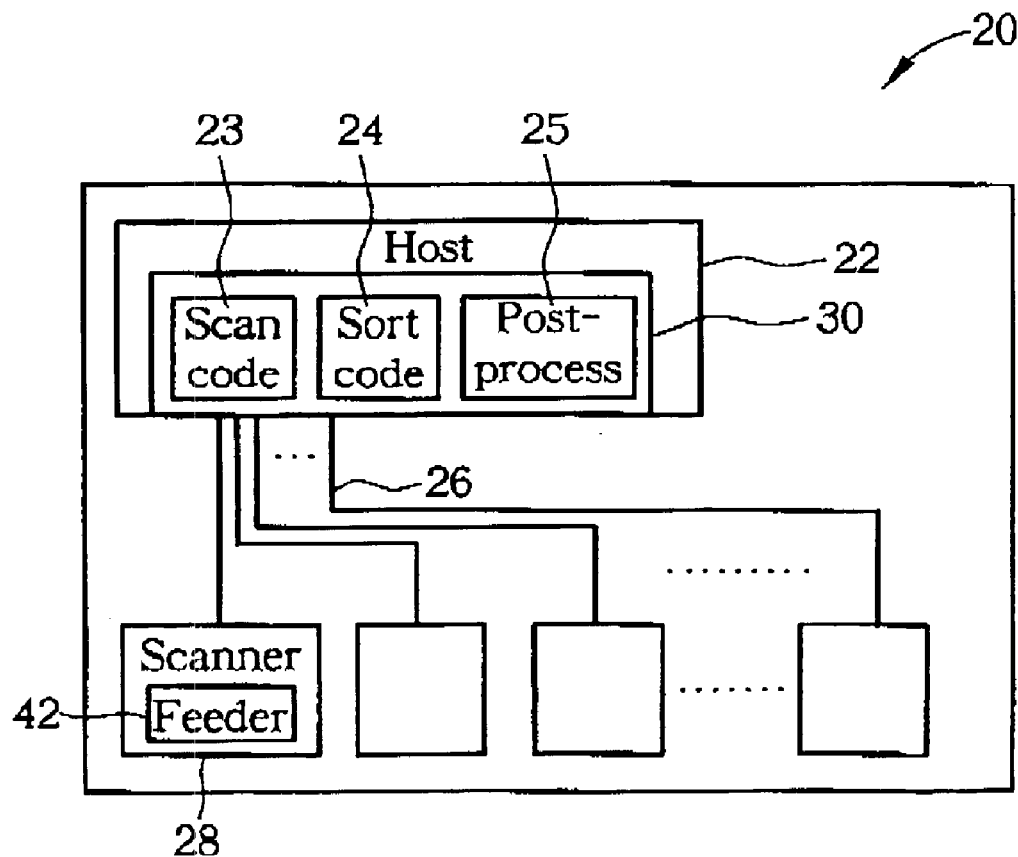
FIG. 2 is a schematic diagram of a first embodiment scan system according to the present invention.

Please refer to FIG. 2 illustrating a schematic diagram of a scan system 20 according to a first embodiment of the present invention. The scan system 20 comprises a host computer 22, a scan code 23, a sort code 24, a post-process code 25, a bus 26, a plurality of scanners 28, and an operating system (OS) 30. The host computer 22 connects parallelly with the plurality of scanners 28 through the bus 26. The bus 26 could be a USB, a firewire (IEEE 1394), or a SCSI to obtain high-speed transmission. The scan code 23 for controlling the scanners 28 parallelly is installed in the host computer 22. The sort code 24 is used to arrange images files generated by the scanners 28 connected to the host computer 22. The post-process code 25 is used to post-process the arranged images files, for instance, by cleaning random spots. The scan code 23, the sort code 24, and the post-process code 25 compose an, application. Each scanner 28 has a feeder 42 for feeding the scanning documents to each scanner 28 automatically piece by piece. After the host computer 22 starts and loads the OS 30, the OS 30 detects the plurality of scanners 28 and connects the host computer 22 with the scanners 28 via the bus 26. Then, a user can execute the sort code 24 that is going to control the whole scan system 20.

After being executed, the sort code 24 generates a job tray and serves a stack of documents put into a scanner 28 each time as a scan job. The job tray records by which scanners each scan job is processed, when the user does the scan job, and to which scan job the generated images files belong. The method of the scan system 20 scanning and a first arrangement comprises the following steps: 1. Put the documents into the feeders 42 of the plurality of scanners 28; 2. Record by which scanner 28 each scan job is processed and the start time of each scan job in the job tray with the sort code 24 stored in the host computer 22; 3. The feeders 42 send the scanning documents into the plurality of scanners 28 piece by piece and the scanners 28 execute the scan jobs; 4. Images files generated by scanning documents are transferred to the host computer 22 via the bus 26. At this time, the sort code 24 stored in the host computer 22 records which scan job generates the images files; 5. The sort code 24 arranges the images files generated in each scan job based on the start time of each scan job recorded in the job tray.

Figure 3:
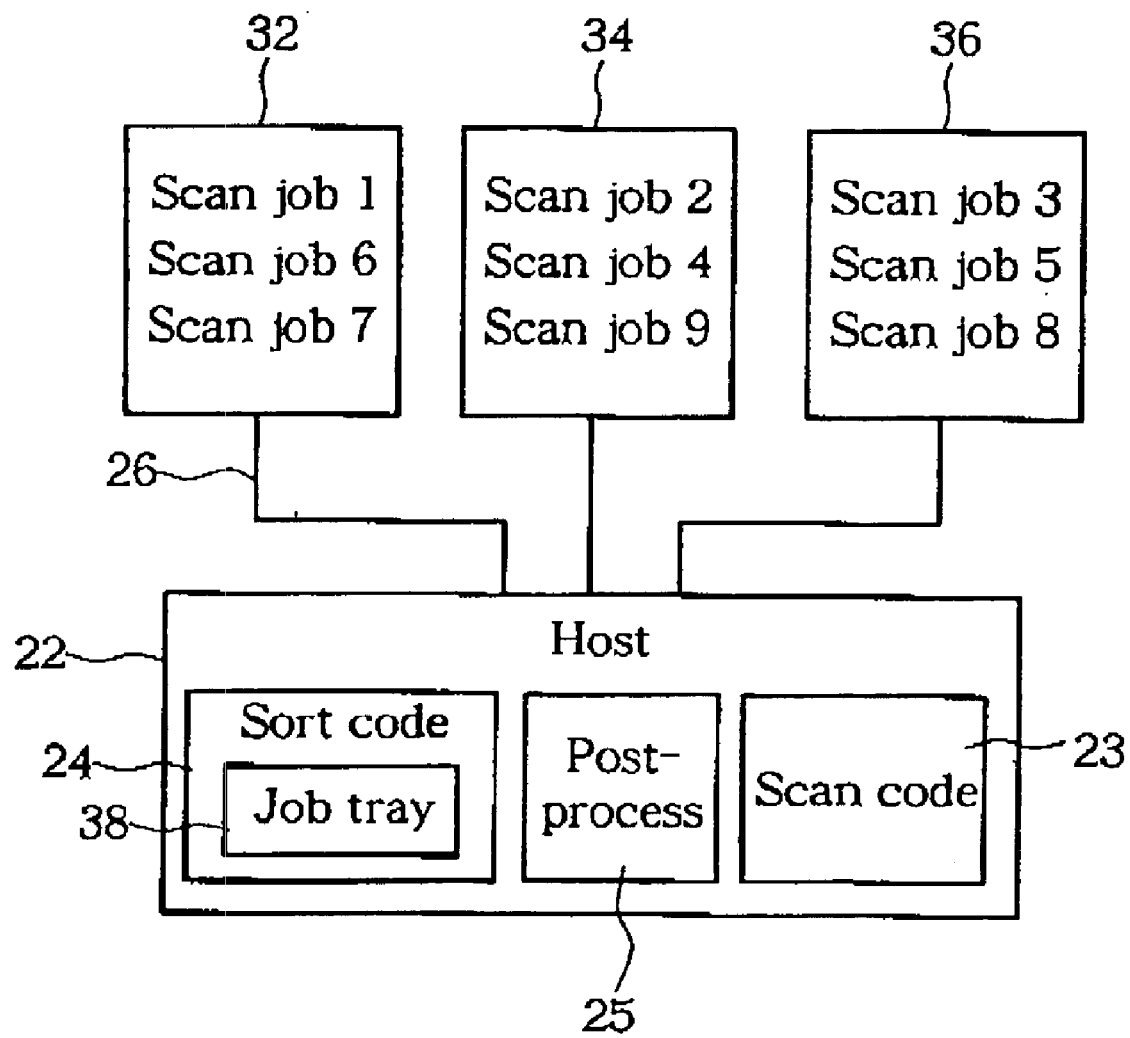
FIG. 3 is a schematic diagram of three scanners connected with the host computer shown in FIG. 2.

Please refer to FIG. 3. FIG. 3 is a schematic diagram of three scanners 32, 34, and 36 connected with the host computer 22. The user assigns a first scan job to the scanner 32, a second scan job to the scanner 34, and a third scan job to the scanner 36. For example, after the scanner 34 finishes the second scan job, the scanners 32, 36 are still processing the first and the third scan jobs. Hence, the user assigns a fourth scan job to the scanner 34. For this reason, the scanner 32 executes the scan jobs 1,6,7, the scanner 34 executes the scan jobs 2,4,9, and the scanner 36 executes the scan jobs 3,5,8. The generated images files are transfer to the host computer 22 via the bus 26. The sort code 24 stored in the host computer 22 records by which scanner 28 each scan job is processed and the start time of each scan job. The sort code 24 further records which scan job the generated images files belong to in a job tray 38, and arranges each generated images files based on the start time of each scan job 1 to 9 recorded in the job tray 38. Therefore, the sort code 24 of the host computer 22 arranges the generated images files based on a sequence of the scan jobs 1→2→3→4→5→6→7→8→9 or 9→8→7→6→5→4→3→2→1. Under these circumstances, the user simply roughly evenly distributes a stack of documents and puts them on the three scanners 32, 34, 36 to scan. As the scanners finish their scan jobs, the user assigns the next scan job to a scanner that is idle.

A second arrangement method according to the present invention differs from the first arrangement method only in step 5. In the second arrangement method, the sort code 24 arranges the generated images files based on a sequence of each scan job received by each scanner 28 and priority of the plurality of the scanners 28, not based on the start time of each scan job recorded in the job tray 38.

Referring to FIG. 3, the scanner 32 executes the scan jobs 1,6,7, the scanner 34 executes the scan jobs 2,4,9, and the scanner 36 executes scan jobs 3,5,8. According to the second arrangement method, given that the priority of the scanner 32 is higher than that of the scanner 34 and the priority of the scanner 34 is higher than that of the scanner 36, the sort code 24 would arrange the images files generated by the scanners 32, 34, 36 based on the sequence 1→2→3→6→4→5→7→9→8. For example, the scan job 4 and the scan job 6 are the second scan job executed by the scanner 34 and the scanner 32 respectively, but the start time of the scan job 4 is earlier than that of the scan job 6. Because the scan job 4 is executed by the scanner 34, the scan job 6 is executed by the scanner 32, and the scanner 32 has priority over the scanner 34, the sort code 24 arranges the images files generated from the scan job 4 ahead of those from the scan job 6. In addition, the scan job 3 is the first scan job of the scanner 36 and the scan job 6 is the second scan job of the scanner 32, so the images files generated from the scan job 3 are arranged ahead of those from the scan job 6. Nevertheless, the sort code 24 also arranges the generated images files from the scanners 32, 34, 36 in the host computer 22 based on the sequence of the scan jobs 8→9→7→5→4→6→3→2→1 or a reverse sequence. In this way, the user can distribute documents to each scanner according to the above sequence.

Figure 4:
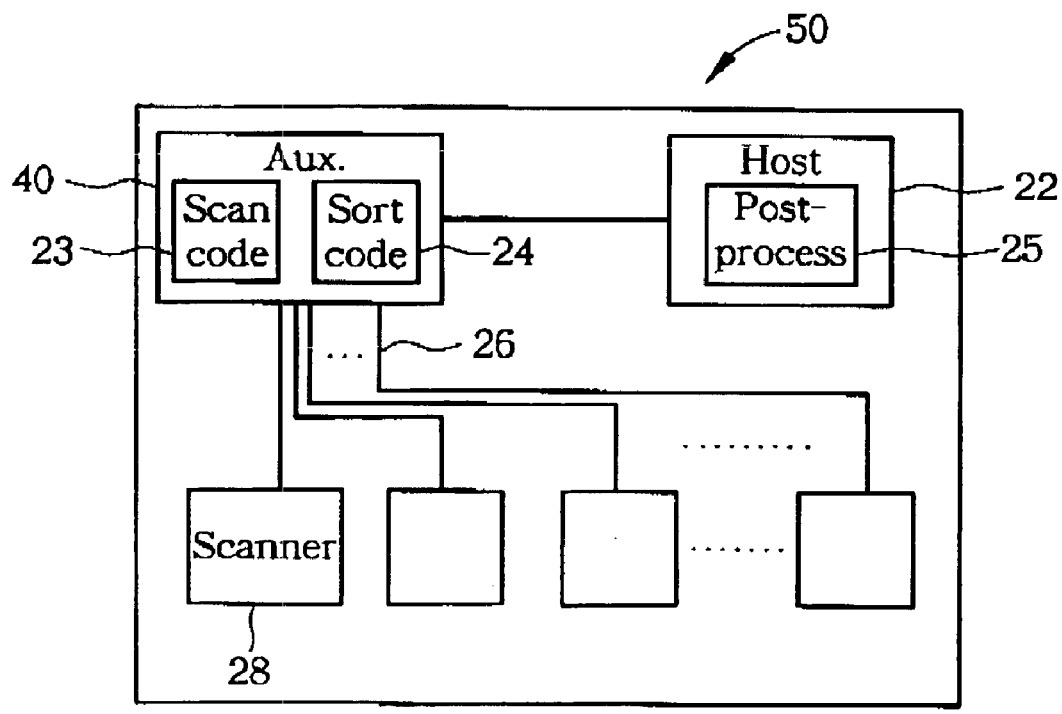
FIG. 4 is a schematic diagram of a second embodiment scan system according to the present invention.

Please refer to FIG. 4. FIG. 4 is a schematic diagram of a second scan system 50 according to the present invention. The difference between the scan system 20 and the scan system 50 is that the scan system 50 further comprises an auxiliary computer 40 connected between the host computer 22 and the plurality of scanners 28. The auxiliary computer 40 controls scan jobs and arrangement jobs of the plurality of scanners 28. As a result of a mass of data generated by simultaneous operation of the scanners 28 if only one host computer 22 is in charge of arrangement, calculation, data-receiving, transmission, and post-processing, the host computer 22 becomes over-burdened resulting in inefficiency and even shut down. Consequently, the auxiliary computer 40 shown in FIG. 4 specializes in receiving the generated images files from the scanners 28 and arranging them (executed by codes 23 and 24), and delivers the images files to the host computer 22 based on the above scan and arrangement steps to perform post-processing (executed by code 25).

Figure 5:
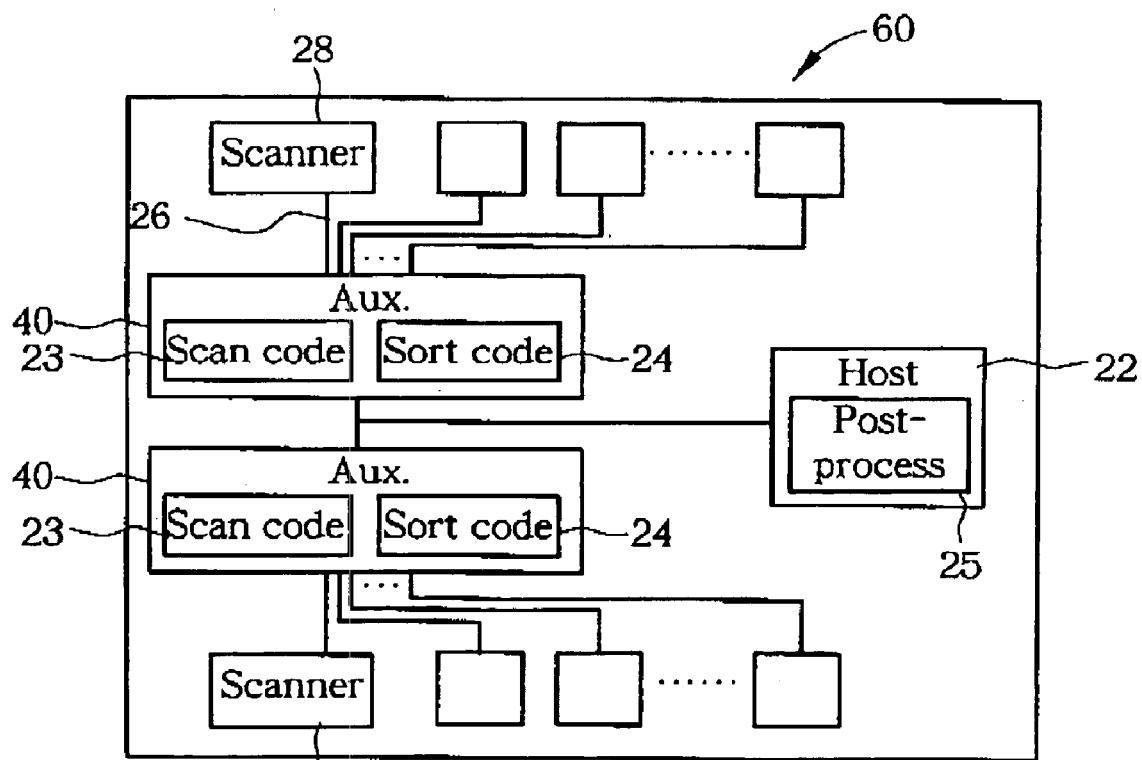
FIG. 5 is a schematic diagram of a third embodiment scan system according to the present invention.

Referring to FIG. 5, FIG. 5 is a schematic diagram of a third scan system 60 according to the present invention. Bus 26 bandwidth of present peripheral devices and bus control devices in computers still are limited. Hence, for simultaneous operation of numerous scanners, it is necessary that a plurality of auxiliary computers 40 be responsible for the scanners 28. As shown in FIG. 5, the scan system 60 comprises a host computer 22, a plurality of auxiliary computers 40, and a plurality of scanners 28. Each auxiliary computer 40 controls some of the plurality of scanners Each auxiliary computer 40 stores a scan code 23 and a sort code 24 to scan and to arrange. The host computer 22 stores a post-process code 25 to post-process the arranged images files. In this way, the user can expand the scan system 20 by increasing the amount of auxiliary computers 40 and the amount of scanners 28 connected to the auxiliary computers 40. As a result of being able to compress the arranged images files, a transmission speed between the host computer 22 and the auxiliary computers 40 does not have to match a transmission speed between the auxiliary computers 40 and the scanners 28. Using a typical network cable is satisfactory.

Consequently, using any of the described methods of the present invention, images files can be arranged as simultaneously generated by the plurality of scanners 28. Moreover, the user is permitted theoretically unlimited expansion of the scan system 60 by increasing the amount of auxiliary computers 40 and the amount of scanners 28 connected with the auxiliary computers 40. The present invention method makes the scan system more efficient and has a cost that remains linear with respect to the amount of the auxiliary computers 40 and scanners 28 employed.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. An application installed in a computer system for controlling a plurality of scanners connected to the computer system being capable of feeding documents automatically, the scanners parallel-connected to the computer system via an interface selecting from a group consisting of IEEE 1394, USB, and SCSI interfaces, the application comprising:

a scan code for controlling the scanners in a parallel manner, wherein the scanners generate a plurality of image files after completing a plurality of scan jobs and transfer the image files to the computer system; and a sort code for sorting the image files, wherein the sort code determines the sequences of the image files generated by the scanners according to the start times of the scan jobs.

2. The application of claim 1 further comprising a post-process code for post-processing the sorted image files.

3. The application of claim 2 wherein the computer system comprises a host computer and a client computer, and the sort code and the scan code are installed in the client computer and the post-process code is installed in the host computer.

4. A method utilizing a computer system for controlling a plurality of scanners connected to the computer system and capable of feeding documents automatically, the scanners connected to the computer system in a parallel manner via an interface selected from a group consisting of IEEE 1394, USB, and SCSI interfaces, the method comprising:

controlling the scanners to scan documents in a parallel manner for completing a plurality of scan jobs, to generate a plurality of images files, and to transfer the image files to the computer system; and controlling the computer system to sort the images files based on the start times of the scan jobs.

5. The method of claim 4 further comprising post-process steps for post-processing the sorted images files.

6. An application installed in a computer system for controlling a plurality of scanners connected to the computer system being capable of feeding documents automatically, the scanners parallel-connected to the computer system via an interface selecting from a group consisting of IEEE 1394, USB, and SCSI interfaces, the application comprising:

a scan code for controlling the scanners in a parallel manner, wherein the scanners generate a plurality of image files after completing a plurality of scan jobs and transfer the image files to the computer system; and a sort code for sorting the image files generated by the scanners based on a scan job number assigned by the corresponding scanner and based on the priority of the corresponding scanner.

7. The application of claim 6 wherein the sort code first sorts the image files according to the scan job number assigned by the corresponding scanner and then sorts the image files according to the priority of the scanners associated with the image files.

8. The application of claim 6 further comprising a post-process code for post-processing the sorted image files.

9. The application of claim 8 wherein the computer system comprises a host computer and a client computer, and the sort code and the scan code are installed in the client computer and the post-process code is installed in the host computer.

10. A method utilizing a computer system for controlling a plurality of scanners connected to the computer system and capable of feeding documents automatically, the scanners connected to the computer system in a parallel manner via an interface selected from a group consisting of IEEE 1394, USB, and SCSI interfaces, the method comprising:

controlling the scanners to scan documents in a parallel manner for completing a plurality of scan jobs, to generate a plurality of images files, and to transfer the image files to the computer system; and controlling the computer system to sort the images files based on a scan job number assigned by the corresponding scanner and based on the priority of the corresponding scanner.

11. The method of claim 10 wherein the computer system sorts the image files according to the scan job number assigned by the corresponding scanner and then sorts the image files according to the priority of the scanners associated with the image files.

12. The method of claim 10 further comprising post-process steps for post-processing the sorted images files.

* * * * *